(12) United States Patent
Liu et al.

(10) Patent No.: US 11,187,649 B2
(45) Date of Patent: Nov. 30, 2021

(54) METHOD FOR CONDUCTING OPTICAL MEASUREMENT USINGFULL MUELLER MATRIX ELLIPSOMETER

(71) Applicant: AK OPTICS TECHNOLOGY CO., LTD., Beijing (CN)

(72) Inventors: Tao Liu, Beijing (CN); Gaozeng Cui, Beijing (CN); Guoguang Li, Beijing (CN); Wei Xiong, Beijing (CN); Langfeng Wen, Beijing (CN)

(73) Assignee: AK OPTICS TECHNOLOGY CO., LTD., Beijing (CN)

( * ) Notice: Subject to any disclaimer, the term of this patent is extended or adjusted under 35 U.S.C. 154(b) by 548 days.

(21) Appl. No.: 16/317,007

(22) PCT Filed: Aug. 19, 2014

(86) PCT No.: PCT/CN2014/084683
§ 371 (c)(1),
(2) Date: Jan. 10, 2019

(87) PCT Pub. No.: WO2015/078202
PCT Pub. Date: Jun. 4, 2015

(65) Prior Publication Data
US 2019/0317010 A1    Oct. 17, 2019

(30) Foreign Application Priority Data
Nov. 26, 2013  (CN) .......................... 201310611422.8

(51) Int. Cl.
*G01N 21/21* (2006.01)
*G01N 21/27* (2006.01)

(52) U.S. Cl.
CPC ......... *G01N 21/211* (2013.01); *G01N 21/274* (2013.01); *G01N 2021/213* (2013.01); *G01N 2201/127* (2013.01)

(58) Field of Classification Search
CPC .................................................. G01N 21/211
(Continued)

(56) References Cited

U.S. PATENT DOCUMENTS

2007/0035743 A1* 2/2007 Vakoc ............... G01B 9/02072
356/495
2012/0176618 A1* 7/2012 Vagos .................. G01N 21/23
356/369

(Continued)

FOREIGN PATENT DOCUMENTS

| CN | 102878940 A | 1/2013 |
| CN | 103134592 A | 6/2013 |
| CN | 103163077 A * | 6/2013 |

OTHER PUBLICATIONS

An office action in relation to Chinese patent application No. 201310611422.8.

*Primary Examiner* — Tarifur R Chowdhury
*Assistant Examiner* — Omar H Nixon
(74) *Attorney, Agent, or Firm* — Platinum Intellectual Property LLP (57) ABSTRACT

A method for conducting optical measurement using a full Mueller matrix ellipsometer, which belongs to the technical field of optical measurements. The optical measurement method comprises: constructing an experimental optical path of a full Mueller matrix ellipsometer; conducting complete regression calibration on the full Mueller matrix ellipsometer; placing a sample to be measured on a sample platform, and obtaining an experimental Fourier coefficient of the sample to be measured; and according to the experimental Fourier coefficient of the sample to be measured, obtaining information about the sample to be measured. Since a calibration method for the full Mueller matrix ellipsometer is not only simple in operation process, but also makes full use of data of the full Mueller matrix ellipsometer (Continued)

measured at the same time, the introduced error is relatively small and the parameter obtained by calibration is more accurate, so that the measurement result is more accurate when the sample to be measured is measured. Thus, the process of the optical measurement method is simplified.

7 Claims, 3 Drawing Sheets

(58) Field of Classification Search
USPC .......................................................... 702/85
See application file for complete search history.

(56) References Cited

U.S. PATENT DOCUMENTS

| | | | |
|---|---|---|---|
| 2013/0044318 A1* | 2/2013 | Cho ..................... | G01N 21/211 356/369 |
| 2014/0375981 A1* | 12/2014 | Wang ................... | G01N 21/956 356/51 |
| 2016/0153894 A1* | 6/2016 | Cho ......................... | G01J 4/04 356/364 |

* cited by examiner

METHOD FOR CONDUCTING OPTICAL MEASUREMENT USINGFULL MUELLER MATRIX ELLIPSOMETER

TECHNICAL FIELD

The present disclosure relates to the field of optical measurement technology, and more particularly to a method for conducting optical measurement with a full Mueller matrix ellipsometer.

BACKGROUND OF THE INVENTION

An ellipsometer is an optical measuring instrument that takes advantage of the polarization characteristics of light to acquire information of a sample to be tested. The working principle of the ellipsometer is as below: letting light passing through a polarizer be incident on a sample to be tested; obtaining the information of the sample to be tested by measuring a change of polarization state (amplitude ratio and phase difference) of an incident light and a reflected light on a surface of the sample to be tested. The ellipsometer with rotatory polarizer or single rotatory compensator can obtain up to 12 parameters of the sample in one measurement. With the advancement of the integrated circuit technology and the complexity of device structure, unknown variables to be measured are continuously increased, and traditional ellipsometers present certain limitations in various aspects, such as film thickness measurement of ultra-thin films, measurement of optical constants for anisotropic materials, depolarization analysis of surface features, and measurement of critical dimensions and topography in integrated circuits. A full Mueller matrix ellipsometer (ellipsometer in a broad sense) can acquire 16 parameters of 4×4 order Mueller matrix in one measurement, obtaining more abundant information as compared with a traditional ellipsometer. It breaks through technical limitations of traditional ellipsometers and enables accurate, fast, non-destructive measurement of film thickness, optical constants, critical dimensions and three-dimensional topography in a wide spectral range.

The key to ensure measurement accuracy and maintain device status for a spectroscopic ellipsometer is the calibration of the device. The ellipsometer may generate system deviation gradually during use as time goes on, especially a thickness of a wave plate is susceptible to changes in temperature and pressure as well as environmental deliquescence. Therefore, a calibration method enabling quick and accurate correction of the ellipsometer is a key technique to ensure device effectiveness and production efficiency. With a calibration process of an existing conventional ellipsometer (FIG. 1), as indicated in Chinese Patent No. 201210375771.X, when a polarization direction of a polarizer is calibrated, typically, a position P1 of the polarizer is fixed in the vicinity of 0°, and then an analyzer A is rotated and a light intensity $I_1$ is measured so as to obtain an $I_1(t)$ curve in this state; then an angle of the polarizer P is changed to put the polarizer P at a position P2, and then the light intensity $I_2$ is measured so as to obtain an $I_2(t)$ curve. The above steps are repeated to measure the light intensities when the polarizer P is at different angles so as to obtain I(t) curves when the polarizer P is at different angles. Fourier series expansion is performed on the I(t) curves above respectively to obtain Fourier coefficients of the polarizer P at different angles; a function is established which is associated with the Fourier coefficients and has a minimum value when the polarization angle of the polarizer P is zero; through data analysis, the position of the polarizer P where the function has the minimum value is found. It can be considered that the angle of the polarizer P is 0 at this position (see Spectroscopic Ellipsometry Principles and Applications, Hiroyuki Fujiwara, 2007 for details). Then, a value of the polarization direction As of the analyzer at a start position is calculated through the Fourier coefficients. With this calibration method, not only the rotation of the analyzer but also the electric or manual rotation of the polarizer P is required, that is, after the polarization direction of the polarizer is determined, the angle of the polarizer needs to be manually or electrically adjusted. In this case, due to instability of mechanical structure and/or error in human operation, an error between an actual angle and an angle desired to be set may be caused, which easily leads to inaccuracy in the measurement of a reference sample. Therefore, if this method is used, the accuracy in angle calibration of the polarizer is relatively low, and thus the measurement accuracy of the ellipsometer is limited. The angle of incidence of light in an ellipsometer can be obtained by manual measurement, but the manual measurement has limited accuracy, and it is sometimes required to measure a reference sample at different angles of incidence to obtain more information thereof, the manual measurement is easy to lead to a wrong result of data analysis due to artificial adjustment error or reading error. Chinese Patent No. 201010137774.0 discloses a device for automatically detecting an angle of incidence in an ellipsometry system, which can realize automatic detection of the angle of incidence, but the device requires position detecting devices to be installed at several places in the system, which makes systematic structure complicated. Moreover, the calibration of the position detecting devices itself is also a complicated process, thus the application of such an automatic detecting device in an ellipsometer is limited.

Figure 3:
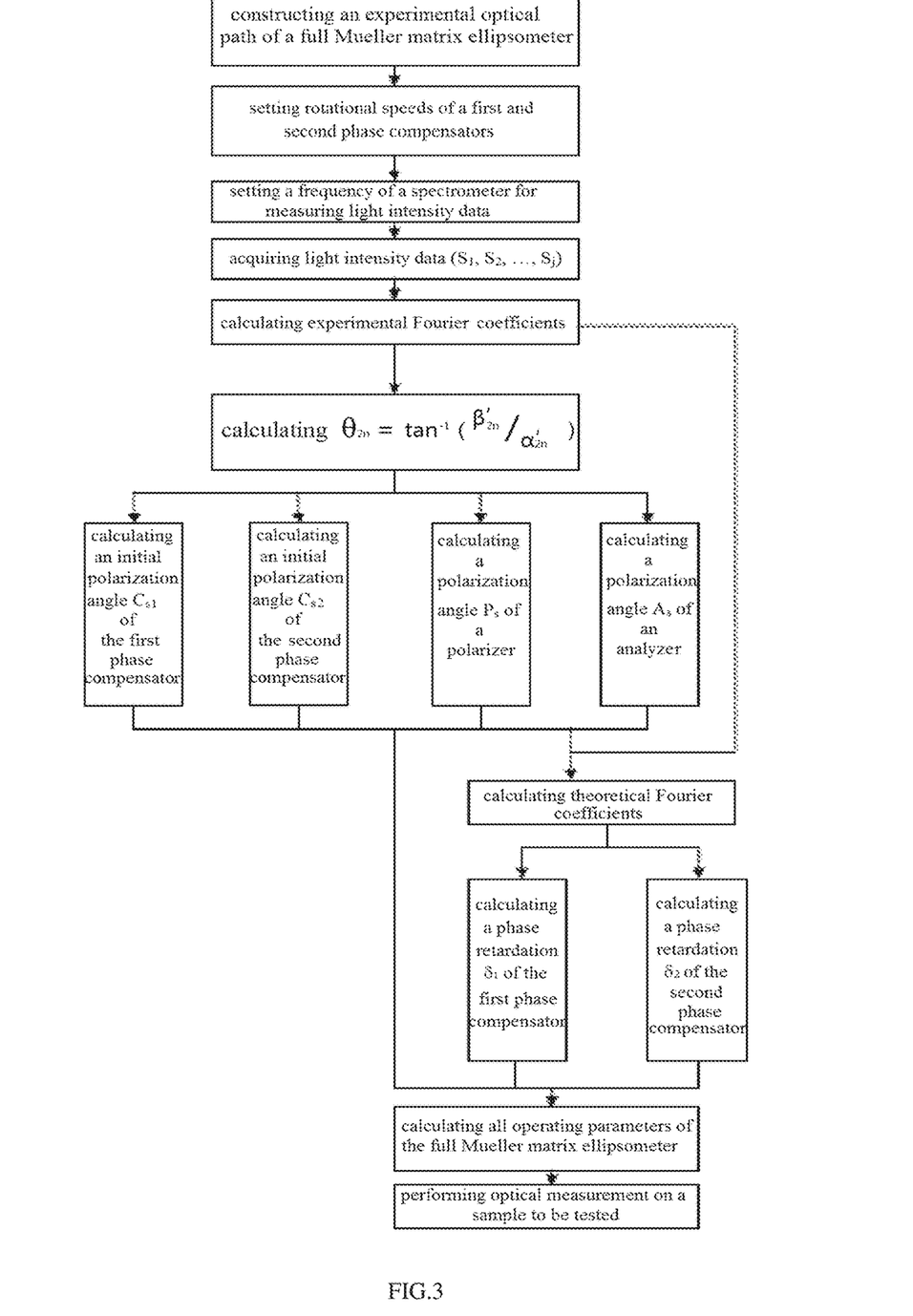
FIG. 3 is a logic block diagram of a method for conducting optical measurement with a full Mueller matrix ellipsometer according to an embodiment 2 of the present invention.

In a systematic calibration of an existing full Mueller matrix ellipsometer, such as the Mueller ellipsometer in US Patent US005956147, a photoelastic modulator (PEM) is used as a phase compensator. When a phase retardation of the PEM is calibrated, it is built in a straight-through ellipsometry system for measurement, and the PEM needs to be taken off the original equipment to measure its corresponding phase retardation. After the calibration is completed, the PEM is reloaded onto the equipment. During the mechanical loading and unloading processes, it cannot be guaranteed that loading position is the same as the previous loading position, which increases systematic error, and re-construction of the straight-through measuring system will increase workload. In the existing literature (Harland G. Tompkins, Eugene A. Irene, Handbook of ellipsometry, 7.3.3.4 Calibration 7), a Mueller ellipsometer uses a wave plate as a phase compensator, the process of which is to build a straight-through measuring platform on an experimental table to measure Fourier coefficients obtained experimentally and use $\delta_1=$ $$2\tan^{-1}\sqrt{\frac{|B'_8|}{|B'_{12}|}} \text{ and } \delta_2 = 2\tan^{-1}\sqrt{\frac{|B'_8|}{|B'_{20}|}},$$

where $|B'_B|=\sqrt{(\alpha'_{2n})^2+(\beta'_{2n})^2}$ for calibration. It is required to remove two phase compensators during calibration and then put back, which increases systematic error. If the calibration is carried out without removing the phase compensators, obliquely-incident measuring arms on both sides of the sample must be rotated to a horizontal position (eg. Woollam's ellipsometer as shown in FIG. 3, the incident arm is rotated from position 1 to position 3 during calibration, and the exiting arm is rotated from position 2 to position 4), which increases the complexity of the system.

In summary, with current techniques, delay spectral lines of all phase compensators being used must be tested prior to device assembly, and a phase retardation of the phase compensator must be calibrated using a straight-through ellipsometry system. The system is required to have a design to adjust an angle of incidence to a straight-through type, and there is a process of changing the angle of incidence during the calibration process. These methods increase the complexity of the system and the calibration process is more complicated.

Since a method for conducting optical measurement with a full Mueller matrix ellipsometer is performed after the calibration of the full Mueller matrix ellipsometer, the complexity in the calibration process of the full Mueller matrix ellipsometer must result in the complexity of the method for conducting optical measurement with a full Mueller matrix ellipsometer.

SUMMARY OF THE INVENTION

In order to solve the above problems, the present disclosure proposes a simplified method for conducting optical measurement with a full Mueller matrix ellipsometer whose calibration process is simplified.

A method for conducting optical measurement with a full Mueller matrix ellipsometer provided by the present disclosure may comprise the following steps:

constructing an experimental optical path of the full Mueller matrix ellipsometer, and wherein the experimental optical path of the full Mueller matrix ellipsometer includes a light source, a polarizer, a first phase compensator, an analyzer, a second phase compensator, a spectrometer, and a sample stage;

performing a total regression calibration on the full Mueller matrix ellipsometer;

placing a sample to be tested on the sample stage, and obtaining experimental Fourier coefficients of the sample to be tested with the full Mueller matrix ellipsometer;

obtaining information of the sample to be tested based on the experimental Fourier coefficients of the sample to be tested.

In addition, a method for calibrating the full Mueller matrix ellipsometer may comprise the following steps:

setting rotational speeds of the first phase compensator and the second phase compensator;

setting a frequency of the spectrometer for measuring light intensity data, so that the spectrometer measures the light intensity data every T/N time, wherein a total of N sets of light intensity data are acquired, where N≥25, and T is a period of measurement;

acquiring the light intensity data measured by the spectrometer;

obtaining respective experimental Fourier coefficients $\alpha'_{2n}$, $\beta'_{2n}$ from N relation formulas between the light intensity data and experimental Fourier coefficients formed by the N sets of light intensity data, based on the light intensity data acquired by a data acquisition module of the spectrometer;

obtaining respective theoretical Fourier coefficients $\alpha_{2n}$, $\beta_{2n}$ based on the respective experimental Fourier coefficients, an initial polarization angle $C_{s1}$ of the first phase compensator and an initial polarization angle $C_{s2}$ of the second phase compensator which have been calibrated;

obtaining, by a phase retardation calculation module for the first phase compensator, a phase retardation $\delta_1$ of the first phase compensator based on the respective theoretical Fourier coefficients, a polarization angle $P_s$ of the polarizer and a polarization angle $A_s$ of the analyzer which have been calibrated, on the basis that a reference sample is isotropic and uniform;

obtaining, by a phase retardation calculation module for the second phase compensator, a phase retardation $\delta_2$ of the second phase compensator, based on the respective theoretical Fourier coefficients, the polarization angle $P_s$ of the polarizer and the polarization angle $A_s$ of the analyzer which have been calibrated, on the basis that the reference sample is isotropic and uniform;

obtaining accurate values of all operating parameters (d, θ, $P_s$, $A_s$, $C_{s1}$, $C_{s2}$, $\delta_1$, $\delta_2$) of the full Mueller matrix ellipsometer through least square fitting according to the relation formulas between the theoretical Fourier coefficients and the operating parameters, with (d, θ, $P_s$, $A_s$, $C_{s1}$, $C_{s2}$, $\delta_1$, $\delta_2$) being as variables, and with the initial polarization angle $C_{s1}$ of the first phase compensator, the initial polarization angle $C_{s2}$ of the second phase compensator, the polarization angle $P_s$ of the polarizer, the polarization angle $A_s$ of the analyzer, the phase retardation $\delta_1$ of the first phase compensator and the phase retardation $\delta_2$ of the second phase compensator, which have been calibrated, being as initial values, where d is a thickness of the reference sample, and θ is an angle at which light is incident on the reference sample.

The method for conducting optical measurement with a full Mueller matrix ellipsometer according to the present disclosure may utilize a reference sample which is isotropic and uniform, and obtain the phase retardation $\delta_1$ of the first phase compensator and the phase retardation $\delta_2$ of the second phase compensator based on the relation formulas between the light intensity data and the experimental Fourier coefficients as well as the polarization angle $P_s$ of the polarizer and the polarization angle $A_s$ of the analyzer which have been calibrated; and then obtains accurate values of all operating parameters (d, θ, $P_s$, $A_s$, $C_{s1}$, $C_{s2}$, $\delta_1$, $\delta_2$) of the full Mueller matrix ellipsometer by least square fitting according to the relation formulas between the theoretical Fourier coefficients and the operating parameters, with (d, θ, $P_s$, $A_s$, $C_{s1}$, $C_{s2}$, $\delta_1$, $\delta_2$) being as variables, and with the initial polarization angle $C_{s1}$ of the first phase compensator, the initial polarization angle $C_{s2}$ of the second phase compensator, the polarization angle $P_s$ of the polarizer, the polarization angle As of the analyzer, the phase retardation $\delta_1$ of the first phase compensator, the phase retardation $\delta_2$ of the second phase compensator, which have been calibrated, being as initial values. The calibration method can take full advantages of measurement data obtained at a same time, which introduces relatively small error and obtains more accurate parameters after calibration. Thus, the result of measurement is more accurate when a sample to be tested is measured using the method of the present disclosure.

DETAILED DESCRIPTION OF THE INVENTION

The present invention will be described in detail below in conjunction with the drawings and specific embodiments for the in-depth understanding of the invention.

Embodiment 1

Figure 1:
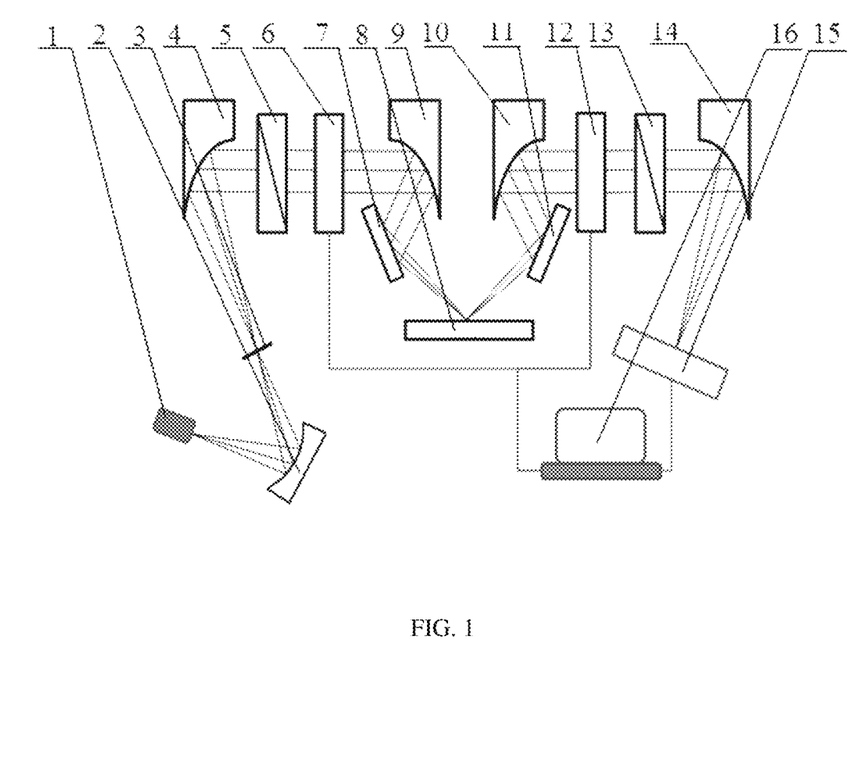
FIG. 1 is a diagram showing an experimental optical path of a full Mueller matrix ellipsometer constructed in a method for conducting optical measurement with a full Mueller matrix ellipsometer according to an embodiment of the present invention.
Figure 2:
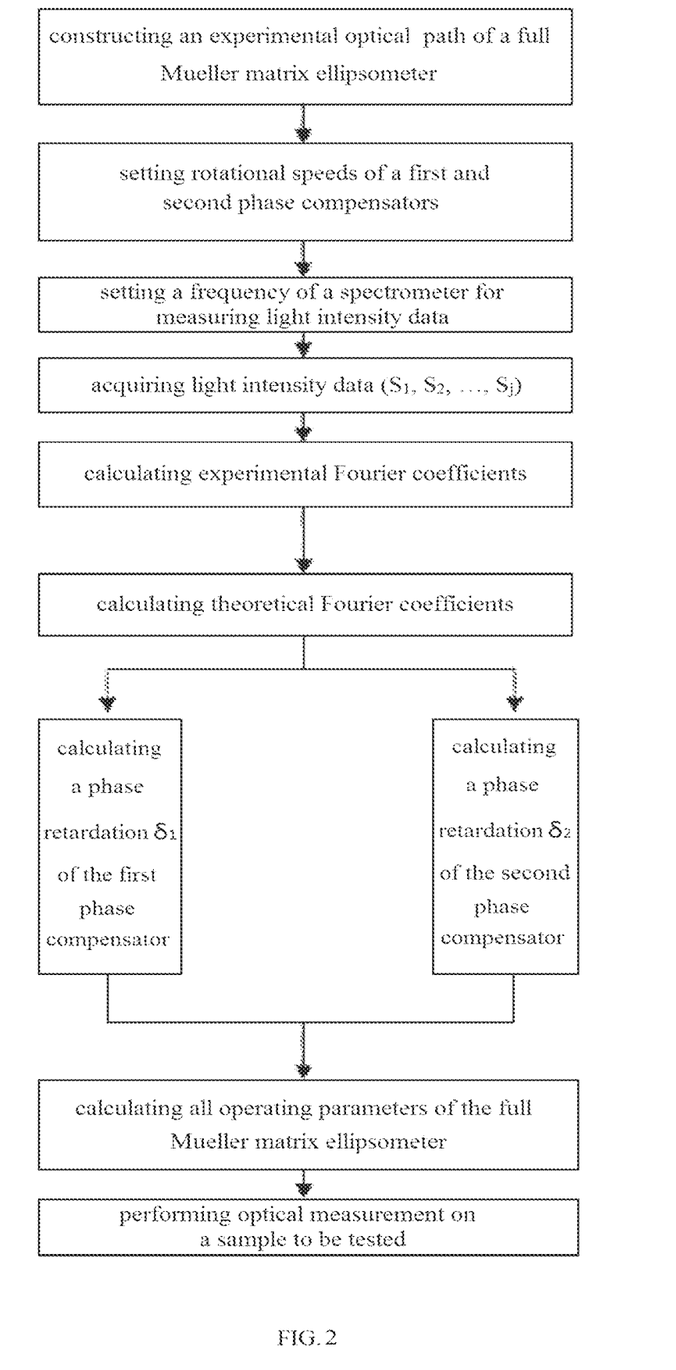
FIG. 2 is a logic block diagram of a method for conducting optical measurement with a full Mueller matrix ellipsometer according to an embodiment 1 of the present invention.

A method for conducting optical measurement with a full Mueller matrix ellipsometer according to Embodiment 1 of the present invention may comprise the following steps:

step 1: referring to FIG. 1, constructing an experimental optical path of a full Mueller matrix ellipsometer. The experimental optical path may include a light source 1, an annular mirror 2, a pinhole 3, a first off-axis parabolic mirror 4, a polarizer 5, a first phase compensator 6, a first plane mirror 7, a sample stage 8, a second off-axis parabolic mirror 9, a third off-axis parabolic mirror 10, a second plane mirror 11, a second phase compensator 12, an analyzer 13, a fourth off-axis parabolic mirror 14, a spectrometer 15 and a terminal 16. An isotropic and uniform reference sample is carried on the sample stage 8. The experimental optical path of the full Mueller matrix ellipsometer, which can be self-calibrated through total regression, may have the following optical process:

$$S_{out} = M_A R(A') R(-C_2) M_{c2}(\delta_2) R(C'_2) \times M_s \times R(-C'_1) M_{c1}(\delta_1) R(C'_1) R(-P') M_P R(P) S_{in}$$

that is, $$\begin{bmatrix} S_A \\ S_B \\ 0 \\ 0 \end{bmatrix} = \begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 1 & 0 & 0 & 0 \\ 0 & \cos 2A & \sin 2A & 0 \\ 0 & -\sin 2A & \cos 2A & 0 \\ 0 & 0 & 0 & 1 \end{bmatrix}$$

$$\begin{bmatrix} 1 & 0 & 0 & 0 \\ 0 & \cos C'_2 & -\sin C'_2 & 0 \\ 0 & \sin C'_2 & \cos C'_2 & 0 \\ 0 & 0 & 0 & 1 \end{bmatrix} \begin{bmatrix} 1 & 0 & 0 & 0 \\ 0 & 1 & 0 & 0 \\ 0 & 0 & \cos \delta_2 & \sin \delta_2 \\ 0 & 0 & -\sin \delta_2 & \cos \delta_2 \end{bmatrix}$$

$$\begin{bmatrix} 1 & 0 & 0 & 0 \\ 0 & \cos C'_2 & \sin C'_2 & 0 \\ 0 & -\sin C'_2 & \cos C'_2 & 0 \\ 0 & 0 & 0 & 1 \end{bmatrix} \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix}$$

$$\begin{bmatrix} 1 & 0 & 0 & 0 \\ 0 & \cos C'_1 & -\sin C'_1 & 0 \\ 0 & \sin C'_1 & \cos C'_1 & 0 \\ 0 & 0 & 0 & 1 \end{bmatrix} \begin{bmatrix} 1 & 0 & 0 & 0 \\ 0 & 1 & 0 & 0 \\ 0 & 0 & \cos \delta_1 & \sin \delta_1 \\ 0 & 0 & -\sin \delta_1 & \cos \delta_1 \end{bmatrix}$$

$$\begin{bmatrix} 1 & 0 & 0 & 0 \\ 0 & \cos C'_1 & \sin C'_1 & 0 \\ 0 & -\sin C'_1 & \cos C'_1 & 0 \\ 0 & 0 & 0 & 1 \end{bmatrix} \begin{bmatrix} 1 & 0 & 0 & 0 \\ 0 & \cos 2P & -\sin 2P & 0 \\ 0 & \sin 2P & \cos 2P & 0 \\ 0 & 0 & 0 & 1 \end{bmatrix}$$

$$\begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 1 & 0 & 0 & 0 \\ 0 & \cos 2P & \sin 2P & 0 \\ 0 & -\sin 2P & \cos 2P & 0 \\ 0 & 0 & 0 & 1 \end{bmatrix} \begin{bmatrix} 1 \\ 0 \\ 0 \\ 0 \end{bmatrix}$$

Step 2 of the method may comprise: performing a total regression calibration on the full Mueller matrix ellipsometer.

Step 3 of the method may comprise: placing the sample to be tested on the sample stage, and obtaining experimental Fourier coefficients of the sample to be tested with the full Mueller matrix ellipsometer.

Step 4 of the method may comprise: obtaining information of the sample to be tested based on the experimental Fourier coefficients of the sample to be tested.

The experimental Fourier coefficients have relation to Mueller elements of the sample, an azimuth angle $P_s$ of the polarizer, an azimuth angle $A_s$ of the analyzer, azimuth angles $C_{s1}$ and $C_{s2}$ of the two phase compensators, and phase retardations $\delta_1$ and $\delta_2$ (refer to Harland G. Tompkins, Eugene A. Irene, Handbook of ellipsometry, 7.3.3 Dual Rotating Compensator 7). However, the Mueller elements of the sample are related to optical constants n, k of a material of the sample, a thickness d, an angle $\theta$ at which light beams are incident on the sample, and a wavelength $\lambda$ of the light beams. Therefore, after the experimental Fourier coefficients of the sample are measured, the Mueller elements of the sample can be obtained according to the above relationships, and then the information of the sample can be obtained.

In an embodiment, the process of performing a total regression calibration on the full Mueller matrix ellipsometer comprises the following steps:

step 21: setting rotational speeds of the first and second phase compensators;

step 22: setting a frequency of a spectrometer for measuring light intensity data, so that the spectrometer may measure the light intensity data every T/N time, and a total of N sets of light intensity data are acquired, wherein N≥25, and T is a period of measurement;

step 23: acquiring the light intensity data measured by the spectrometer;

step 24: obtaining respective experimental Fourier coefficients $\alpha'_{2n}/\beta'_{2n}$ from N relation formulas between the light intensity data and the experimental Fourier coefficients formed by the N sets of light intensity data, based on the light intensity data acquired by a data acquisition module of the spectrometer;

step 25: obtaining respective theoretical Fourier coefficients $\alpha_{2n}$, $\beta_{2n}$ according to the respective experimental Fourier coefficients, an initial polarization angle $C_{s1}$ of the first phase compensator and the initial polarization angle $C_{s2}$ of the second phase compensator which have been calibrated;

step 26: obtaining, on the basis that a reference sample is isotropic and uniform, by a phase retardation calculation module for the first phase compensator, phase retardation $\delta_1$ of the first phase compensator based on the respective theoretical Fourier coefficients, a polarization angle $P_s$ of the polarizer and a polarization angle $A_s$ of the analyzer which have been calibrated; and obtaining, on the basis that the reference sample is isotropic and uniform, by a phase retardation calculation module for the second phase compensator, phase retardation $\delta_2$ of the second phase compensator based on the respective theoretical Fourier coefficients, a polarization angle $P_s$ of the polarizer and a polarization angle $A_s$ of the analyzer which have been calibrated;

step 27: obtaining accurate values of all operating parameters (d, θ, $P_s$, $A_s$, $C_{s1}$, $C_{s2}$, $\delta_1$, $\delta_2$) of the full Mueller matrix ellipsometer through least square fitting according to the relation formulas between the theoretical Fourier coefficients and the operating parameters, with (d, θ, $P_s$, $A_s$, $C_{s1}$, $C_{s2}$, $\delta_1$, $\delta_2$) being as variables, and with the initial polarization angle $C_{s1}$ of the first phase compensator, the initial polarization angle $C_{s2}$ of the second phase compensator, the polarization angle $P_s$ of the polarizer, the polarization angle $A_s$ of the analyzer, the phase retardation $\delta_1$ of the first phase compensator, the phase retardation $\delta_2$ of the second phase compensator, which have been calibrated, being as initial values, where d is a thickness of the reference sample, and θ is an angle at which light is incident on the reference sample.

A corresponding Mueller matrix of the reference sample that is isotropic and uniform is:

$$M_s = \begin{bmatrix} M_{11} & M_{12} & 0 & 0 \\ M_{21} & M_{22} & 0 & 0 \\ 0 & 0 & M_{33} & M_{34} \\ 0 & 0 & M_{43} & M_{44} \end{bmatrix}$$

Taking N=36, the ratio of the rotation speed of the first phase compensator 6 to the rotation speed of the second phase compensator 12 equaling 5:3 as an example, at this time, the first phase compensator 6 and the second phase compensator 12 are respectively in a rotating state, and the ratio of the rotation speed of the first phase compensator 6 to the rotation speed of the second phase compensator 12 equals 5:3. At this time, $C'_1=5(C-C_{s1})$, $C'_2=3(C-C_{s2})$, and the time during which the first phase compensator 6 rotates 5 turns or the second phase compensator 12 rotates 3 turns is a period T, and where:

$-C_{s1}$, an angle of a fast optical axis of the first phase compensator 6 at a time t=0, $-C_{s2}$, an angle of a fast optical axis of the second phase compensator 12 at a time t=0, C=ωt, a rotation angle by which the first phase compensator 6 and the second phase compensator 12 rotate at a fundamental physical frequency ω.

$$S_j = \int_{\frac{(j-1)T}{36}}^{\frac{jT}{36}} I'_0 \left[1 + \sum_{n=1}^{16} (\alpha'_{2n}\cos 2n\omega t + \beta'_{2n}\sin 2n\omega t)\right] dt = \quad 2.1$$

$$\frac{\pi I'_0}{36\omega} + \sum_{n=1}^{16} \frac{I'_0}{n\omega}\left(\sin\frac{n\pi}{36}\right)\left[\alpha'_{2n}\cos\frac{(2j-1)n\pi}{36} + \beta'_{2n}\sin\frac{(2j-1)n\pi}{36}\right]$$

$(j = 1, 2 \ldots 36)$ where ω=π/T.

With the acquired S1, S2, S3 . . . S36, 36 equations containing 25 unknowns can be obtained through the above formula (n=9, 12, 14, 15, the primed Fourier coefficients $\alpha'_{2n}$=0 and $\beta'_{2n}$=0). Through a nonlinear least square method, a total of 24 primed Fourier coefficients $\alpha'_{2n}$ and $\beta'_{2n}$ can be obtained.

The transformation relationship between the theoretical Fourier coefficients $\alpha_{2n}$ and $\beta_{2n}$ and the experimental Fourier coefficients $\alpha'_{2n}$ and $\beta'_{2n}$ is expressed in formulas 2.7 and 2.8:

$$\alpha_{2n}=\alpha'_{2n}\cos\phi_{2n}+\beta'_{2n}\sin\phi_{2n} \quad 2.7$$

$$\beta_{2n}=-\alpha'_{2n}\sin\phi_{2n}+\beta'_{2n}\cos\phi_{2n} \quad 2.8$$

where:
$\phi_2=12C_{s2}-10C_{s1}$; $\phi_4=10C_{s1}-6C_{s2}$;
$\phi_6=6C_{s2}$; $\phi_8=20C_{s1}-12C_{s2}$;
$\phi_{10}=10C_{s1}$; $\phi_{12}=12C_{s2}$;
$\phi_{14}=20C_{s1}-6C_{s2}$; $\phi_{16}=10C_{s1}+6C_{s2}$;
$\phi_{20}=20C_{s1}$; $\phi_{22}=10C_{s1}+12C_{s2}$;
$\phi_{26}=20C_{s1}+6C_{s2}$; $\phi_{32}=20C_{s1}+12C_{s2}$ The theoretical Fourier coefficients $\alpha_{2n}$ and $\beta_{2n}$ can be obtained from the formulas 2.7 and 2.8.

For a sample which is isotropic and uniform, $M_{13}=M_{31}=M_{14}=M_{41}=M_{23}=M_{32}=M_{24}=M_{42}=0$. Further, according to theoretical principles of the Mueller ellipsometer, the following theoretical expressions for the theoretical Fourier coefficients $\alpha_2$, $\beta_2$, $\alpha_{10}$, $\beta_{10}$, $\alpha_6$, $\beta_6$, $\alpha_{14}$, $\beta_{14}$, $\alpha_{22}$, $\beta_{22}$, $\alpha_{26}$, $\beta_{26}$ can be obtained:

$$\alpha_6 = M_{43}\cos^2\frac{\delta_1}{2}\sin\delta_2\sin 2P_s\sin 2A_s \quad 2.9$$

$$\beta_6 = -M_{43}\cos^2\frac{\delta_1}{2}\sin\delta_2\sin 2P_s\cos 2A_s \quad 2.10$$

$$\alpha_{14} = -0.5M_{43}\sin^2\frac{\delta_1}{2}\sin\delta_2\cos 2(P_s - A_s) \quad 2.11$$

$$\beta_{14} = -0.5M_{43}\sin^2\frac{\delta_1}{2}\sin\delta_2\sin 2(P_s - A_s) \quad 2.12$$

$$\alpha_{26} = 0.5M_{43}\sin^2\frac{\delta_1}{2}\sin\delta_2\cos 2(P_s + A_s) \quad 2.13$$

$$\beta_{26} = 0.5M_{43}\sin^2\frac{\delta_1}{2}\sin\delta_2\sin 2(P_s + A_s) \quad 2.14$$

From formulas 2.10 and 2.12, it can be obtained:

$$\frac{\beta_{14}}{\beta_6} = \frac{0.5\sin 2(P_s - A_s)}{\sin 2P_s \cos 2A_s} \times \tan^2\frac{\delta_1}{2} \quad 2.15$$

$$\delta_1 = \cos^{-1}\left[\frac{1 - \frac{2\beta_{14}\sin 2P_s\cos 2A_s}{\beta_6 \sin 2(P_s+A_s)}}{1 + \frac{2\beta_{14}\sin 2P_s\cos 2A_s}{\beta_6 \sin 2(P_s+A_s)}}\right]$$

Where $(P_s + A_s) \neq \frac{n\pi}{2}$ and $P_s \neq \frac{n\pi}{2}$ and $A_s \neq \frac{\pi}{4} + \frac{n\pi}{2}$ (n is an integer) (the Fourier coefficients must be guaranteed to be non-zero)

Similarly, the phase retardation $\delta_1$ of the compensator can also be calculated through formulas 2.9 and 2.12, formulas 2.9 and 2.11, formulas 2.10 and 2.11, formulas 2.9 and 2.13, formulas 2.9 and 2.14, formulas 2.10 and 2.13, formulas 2.10 and 2.14.

The phase retardation $\delta_2$ of the second compensator is calibrated below.

$$\alpha_2 = 0.5M_{34}\sin\delta_1\sin^2\frac{\delta_2}{2}\cos 2(P_s - A_s) \quad 2.16$$

$$\beta_2 = -0.5M_{34}\sin\delta_1\sin^2\frac{\delta_2}{2}\sin 2(P_s - A_s) \quad 2.17$$

$$\alpha_{10} = -M_{34}\sin\delta_1\cos^2\frac{\delta_2}{2}\sin 2P_s\sin 2A_s \quad 2.18$$

-continued $$\beta_{10} = M_{34}\sin\delta_1\cos^2\frac{\delta_2}{2}\sin 2P_s\cos 2A_s \quad 2.19$$

$$\alpha_{22} = -0.5M_{34}\sin\delta_1\sin^2\frac{\delta_2}{2}\cos 2(P_s+A_s) \quad 2.20$$

$$\beta_{22} = -0.5M_{34}\sin\delta_1\sin^2\frac{\delta_2}{2}\sin 2(P_s+A_s) \quad 2.21$$

From formulas 2.16 and 2.18, it can be obtained:

$$\frac{\alpha_2}{\alpha_{10}} = -\frac{0.5\cos 2(P_s-A_s)}{\sin 2P_s\sin 2A_s}\times\tan^2\frac{\delta_2}{2} \quad 2.22$$

$$\delta_2 = \cos^{-1}\left[\frac{1+\frac{2\alpha_2\sin 2P_s\sin 2A_s}{\alpha_{10}\cos 2(P_s-A_s)}}{1-\frac{2\alpha_2\sin 2P_s\sin 2A_s}{\alpha_{10}\cos 2(P_s-A_s)}}\right]$$

where $(P_s - A_s) \neq \frac{\pi}{4} + \frac{n\pi}{2}$ and $P_s \neq \frac{n\pi}{2}$ and $A_s \neq \frac{n\pi}{2}$ (n is an integer) (the Fourier coefficients must be guaranteed to be non-zero)

Similarly, the phase retardation $\delta_2$ of the compensator can also be calibrated through formulas 2.16 and 2.19, formulas 2.17 and 2.18, formulas 2.17 and 2.19, formulas 2.18 and 2.20, formulas 2.18 and 2.21, formulas 2.19 and 2.20, formulas 2.19 and 2.21.

The transformation of the experimental Fourier coefficients and the theoretical Fourier coefficients can be realized by the formulas 2.7 and 2.8. Meanwhile, the theoretical Fourier coefficients have relation to Mueller elements of the sample, an azimuth angle $P_s$ of the polarizer, an azimuth angle $A_s$ of the analyzer, azimuth angles $C_{s1}$ and $C_{s2}$ of the two phase compensators, and the phase retardations $\delta_1$ and $\delta_2$ (refer to Harland G. Tompkins, Eugene A. Irene, Handbook of ellipsometry, 7.3.3 Dual Rotating Compensator 7). Mueller elements of the sample are related to optical constants n, k of a material of the sample, thickness d, an angle $\theta$ at which light beams are incident on the sample, and a wavelength $\lambda$ of the light beams. The experimental Fourier coefficients $\alpha'_{2n}$ and $\beta'_{2n}$ are related to (n, k, d, $\theta$, $\lambda$, $P_s$, $A_s$, $C_{s1}$, $C_{s2}$, $\delta_1$, $\delta_2$), $\theta$ is an angle at which light beams are incident on the sample. For a reference sample with known optical constants n, k under a single wavelength, there are 24 $\alpha'_{2n}$ and $\beta'_{2n}$ in total obtained by measurement in an experiment, and correspondingly 24 equations can be obtained, which are related only to (d, $\theta$, $\lambda$, $P_s$, $A_s$, $C_{s1}$, $C_{s2}$, $\delta_1$, $\delta_2$). The $P_s$, $A_s$, $C_{s1}$, $C_{s2}$, $\delta_1$, $\delta_2$ obtained above by calibration can be used as initial values, and the wavelength corresponding to the measurement in the experiment are known; 24 equations obtained according to experimental Fourier coefficients have relation to (d, $\theta$, $P_s$, $A_s$, $C_{s1}$, $C_{s2}$, $\delta_1$, $\delta_2$). Thus, the remaining operating parameters (d, $\theta$, $P_s$, $A_s$, $C_{s1}$, $C_{s2}$, $\delta_1$, $\delta_2$) of the Mueller ellipsometer can be obtained by the least square fitting. The reference sample may be a silicon dioxide film sample with silicon as the substrate, the optical constants n and k of which can be consulted in the literatures. Taking the wavelength of 632.8 nm as an example, the optical constants of the reference sample are n=1.457, and k=0.

When N=25, an experimental Fourier coefficient calculation module directly obtains the respective experimental Fourier coefficients $\alpha'_{2n}$, $\beta'_{2n}$ based on N relation formulas between light intensity data and experimental Fourier coefficients formed by the N sets of light intensity data.

When N>25, the experimental Fourier coefficient calculation module obtains the respective experimental Fourier coefficients $\alpha'_{2n}$, $\beta'_{2n}$ by the least square method according to N relation formulas between light intensity data and experimental Fourier coefficients formed by the N sets of light intensity data.

The light source may be a broad spectrum light source. The number of wavelengths of light which can be generated by the light source is N', and the number of relation formulas between theoretical Fourier coefficients and operating parameters may be 24×N'.

The number of the reference samples which are isotropic and uniform may be m, and the number of relation formulas between theoretical Fourier coefficients and operating parameters may be 24×N'×m.

Embodiment 2

Referring to FIG. 3, the difference between the total regression self-calibrated full Mueller matrix ellipsometer according to the embodiment 2 of the present invention and the total regression self-calibrated full Mueller matrix ellipsometer according to the embodiment 1 of the present invention lies in that: the total regression self-calibration method of the total regression self-calibrated full Mueller matrix ellipsometer according to the embodiment 2 of the present invention may further comprise the following steps:

obtaining respective $\theta_{2n}$ based on respective experimental Fourier coefficients $\alpha'_{2n}$, $\beta'_{2n}$, where $\theta_{2n}$ is an intermediate parameter defined for the convenience of calculation;

obtaining an initial polarization angle $C_{s1}$ of a first phase compensator based on the respective $\theta_{2n}$;

obtaining an initial polarization angle $C_{s2}$ of a second phase compensator based on the respective $\theta_{2n}$;

obtaining a polarization angle $P_s$ of a polarizer based on the respective $\theta_{2n}$;

obtaining a polarization angle $A_s$ of an analyzer based on the respective $\theta_{2n}$;

where $$\theta_{2n}=\tan^{-1}(\beta'_{2n}/\alpha'_{2n}) \quad 2.2$$

Using the method available in the literature (R. W. Collins and JoohyunKoh Dual rotating-compensator multichannel ellipsometer: instrument design for real-time Mueller matrix spectroscopy of surfaces and films Vol. 16, No. 8/August 1999/J. Opt. Soc. Am. A 1997 to 2006), which corresponds to the following formulas 2.3 to 2.6, the initial polarization angles Cs1 and Cs2 of the compensators, as well as the polarization angles $P_s$ and $A_s$ of the polarizer and the analyzer can be calibrated.

$$C_{s1} = \frac{\theta_{14}-\theta_4}{10} \quad 2.3$$

$$C_{s2} = \frac{\theta_2+\theta_4}{6} \quad 2.4$$

$$P_s = \left(\frac{\theta_4+\theta_6}{4}\right) - 5C_{s1} \quad 2.5$$

$$As = \left(\frac{\theta_{16}-\theta_4}{4}\right) - 3C_{s2} \quad 2.6$$

On the basis of calibrated $P_s$, $A_s$, $C_{s1}$, and $C_{s2}$, in the case that the compensators are not disassembled from the experimental stage or equipment for separate measurement, the method we proposed can calibrate phase retardations of both compensators under different wavelengths in one experiment. The calibration process is accurate and simple.

The above embodiments describe the objects, the technical solutions and advantages of the present invention in detail. However, it should be appreciated that the foregoing is only specific embodiments of the present invention rather than limiting the invention. Therefore, any modification, equivalent substitution, improvement, etc. made within the spirit and principle of the present invention are intended to be included within the scope of the present invention.

The invention claimed is:

1. A method for conducting optical measurement with a full Mueller matrix ellipsometer, comprising the following steps:
   constructing an experimental optical path of the full Mueller matrix ellipsometer, the experimental optical path of the full Mueller matrix ellipsometer including a light source, a polarizer, a first phase compensator, an analyzer, a second phase compensator, a spectrometer, and a sample stage;
   performing a total regression calibration on operating parameters of the full Mueller matrix ellipsometer;
   placing a sample to be tested on the sample stage, and obtaining experimental Fourier coefficients of the sample to be tested with the full Mueller matrix ellipsometer;
   obtaining information of the sample to be tested based on the experimental Fourier coefficients of the sample to be tested;
   wherein a method for calibrating the full Mueller matrix ellipsometer comprises the following steps:
   setting rotational speeds of the first phase compensator and the second phase compensator;
   setting a frequency of the spectrometer for measuring light intensity data, so that the spectrometer measures the light intensity data every T/N time, wherein a total of N sets of light intensity data are acquired, where N≥25, and T is a period of measurement;
   acquiring the light intensity data measured by the spectrometer;
   obtaining respective experimental Fourier coefficients $\alpha'_{2n}$, $\beta'_{2n}$ from N relation formulas between the light intensity data and experimental Fourier coefficients formed by the N sets of light intensity data, based on the light intensity data acquired by a data acquisition module of the spectrometer;
   obtaining respective theoretical Fourier coefficients $\alpha_{2n}$, $\beta_{2n}$ based on the respective experimental Fourier coefficients, an initial polarization angle $C_{s1}$ of the first phase compensator and an initial polarization angle $C_{s2}$ of the second phase compensator which have been calibrated;
   obtaining, by a phase retardation calculation module for the first phase compensator, a phase retardation $\delta_1$ of the first phase compensator based on the respective theoretical Fourier coefficients, a polarization angle $P_s$ of the polarizer and a polarization angle $A_s$ of the analyzer which have been calibrated, on the basis that a reference sample is isotropic and uniform;
   obtaining, by a phase retardation calculation module for the second phase compensator, a phase retardation $\delta_2$ of the second phase compensator, based on the respective theoretical Fourier coefficients, the polarization angle $P_s$ of the polarizer and the polarization angle $A_s$ of the analyzer which have been calibrated, on the basis that the reference sample is isotropic and uniform;
   obtaining accurate values of all operating parameters (d, θ, $P_s$, $A_s$, $C_{s1}$, $C_{s2}$, $\delta_1$, $\delta_2$) of the full Mueller matrix ellipsometer through least square fitting according to the relation formulas between the theoretical Fourier coefficients and the operating parameters, with (d, θ, $P_s$, $A_s$, $C_{s1}$, $C_{s2}$, $\delta_1$, $\delta_2$) being as variables, and with the initial polarization angle $C_{s1}$ of the first phase compensator, the initial polarization angle $C_{s2}$ of the second phase compensator, the polarization angle $P_s$ of the polarizer, the polarization angle $A_s$ of the analyzer, the phase retardation $\delta_1$ of the first phase compensator and the phase retardation $\delta_2$ of the second phase compensator, which have been calibrated, being as initial values, where d is a thickness of the reference sample, and θ is an angle at which light is incident on the reference sample.

2. The method of claim 1, further comprising the following steps:
   obtaining respective $\theta_{2n}=\tan^{-1}(\beta'_{2n}/\alpha'_{2n})$ based on the respective experimental Fourier coefficients $\alpha'_{2n}$, $\beta'_{2n}$;
   obtaining the initial polarization angle $C_{s1}$ of the first phase compensator based on the respective $\theta_{2n}$;
   obtaining the initial polarization angle $C_{s2}$ of the second phase compensator based on the respective $\theta_{2n}$;
   obtaining the polarization angle $P_s$ of the polarizer based on the respective $\theta_{2n}$; and
   obtaining the polarization angle $A_s$ of the analyzer based on the respective $\theta_{2n}$.

3. The method of claim 1, wherein N=25, and an experimental Fourier coefficient calculation module directly obtains the respective experimental Fourier coefficients $\alpha'_{2n}$, $\beta'_{2n}$ based on N relation formulas between the light intensity data and experimental Fourier coefficients formed by the N sets of light intensity data.

4. The method of claim 1, wherein N>25, and an experimental Fourier coefficient calculation module obtains the respective experimental Fourier coefficients $\alpha'_{2n}$, $\beta'_{2n}$ through least square method based on N relation formulas between the light intensity data and experimental Fourier coefficients formed by the N set of light intensity data.

5. The method of claim 1, wherein the light source is a broad spectrum light source, and the number of wavelengths of light which can be generated by the light source is N', and the number of relation formulas between the theoretical Fourier coefficients and the operating parameters is 24×N'.

6. The method of claim 5, wherein the number of the reference samples which are isotropic and uniform is m, and the number of relation formulas between the theoretical Fourier coefficients and the operating parameters is 24×N'×m.

7. The method of claim 1, wherein the reference sample is a silicon dioxide film with silicon as a substrate.

* * * * *